United States Patent
Kim et al.

(10) Patent No.: US 11,106,886 B2
(45) Date of Patent: Aug. 31, 2021

(54) COMBINED FINGERPRINT RECOGNITION TOUCH SENSOR, ELECTRONIC APPARATUS INCLUDING THE SAME, AND FINGERPRINT ENROLLMENT METHOD

(71) Applicant: SAMSUNG ELECTRONICS CO., LTD., Suwon-si (KR)

(72) Inventors: Jinmyoung Kim, Hwaseong-si (KR); Huijin Lee, Pohang-si (KR); Minchul Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/922,185

(22) Filed: Jul. 7, 2020

(65) Prior Publication Data

US 2021/0165987 A1    Jun. 3, 2021

(30) Foreign Application Priority Data

Dec. 3, 2019 (KR) .................. 10-2019-0159370

(51) Int. Cl.
*G06K 9/00* (2006.01)
*G06F 3/044* (2006.01)
*G06F 3/041* (2006.01)

(52) U.S. Cl.
CPC .......... *G06K 9/0002* (2013.01); *G06F 3/0446* (2019.05); *G06F 3/04166* (2019.05); *G06K 9/00087* (2013.01); *G06K 9/00926* (2013.01)

(58) Field of Classification Search
CPC ............. G06K 9/0002; G06K 9/00926; G06K 9/00087; G06F 3/0446; G06F 3/04166
See application file for complete search history.

(56) References Cited

U.S. PATENT DOCUMENTS

| 9,996,179 B2 | 6/2018 | Bae et al. |
| 10,121,050 B2 | 11/2018 | Weber et al. |
| 10,345,950 B2 | 7/2019 | Yoon et al. |

(Continued)

FOREIGN PATENT DOCUMENTS

| KR | 1020150131944 A | 11/2015 |
| KR | 1020170129476 A | 11/2017 |

(Continued)

*Primary Examiner* — Premal R Patel
(74) *Attorney, Agent, or Firm* — Sughrue Mion, PLLC

(57) ABSTRACT

Provided are a combined fingerprint recognition touch sensor, an electronic apparatus including the same, and a fingerprint enrollment method to which the same is applied. The combined fingerprint recognition touch sensor includes parallel transmission lines extending in a touch sensing region, and a plurality of parallel reception lines extending in the touch sensing region to intersect the transmission lines. A signal transmitter includes a plurality of transmission groups so as to apply driving signals to the transmission lines. A storage is configured to store an enrolled fingerprint image to be compared with an enrolled fingerprint for fingerprint authentication. In the fingerprint enrollment mode, a fingerprint image of a finger is obtained through one touch operation by applying driving signals to transmission lines belonging to two or more transmission groups and reading a fingerprint image of a sensing zone including an initial touch region and a surrounding region.

20 Claims, 8 Drawing Sheets

(56) References Cited

U.S. PATENT DOCUMENTS

| | | | |
|---|---|---|---|
| 10,586,089 B2 | 3/2020 | Setterberg et al. | |
| 2017/0024602 A1* | 1/2017 | Han | G06F 3/0445 |
| 2017/0123555 A1* | 5/2017 | Kim | G06K 9/00013 |
| 2017/0336910 A1* | 11/2017 | Han | G06F 3/0446 |
| 2017/0344779 A1 | 11/2017 | Yoon | |
| 2018/0082102 A1* | 3/2018 | Lee | G06F 21/32 |
| 2018/0232509 A1* | 8/2018 | Park | G06K 9/0008 |

FOREIGN PATENT DOCUMENTS

| | | |
|---|---|---|
| KR | 1020180013872 A | 2/2018 |
| KR | 1020180093917 A | 8/2018 |
| KR | 101923320 B1 | 11/2018 |

* cited by examiner

COMBINED FINGERPRINT RECOGNITION TOUCH SENSOR, ELECTRONIC APPARATUS INCLUDING THE SAME, AND FINGERPRINT ENROLLMENT METHOD

CROSS-REFERENCE TO RELATED APPLICATION

This application claims priority from Korean Patent Application No. 10-2019-0159370, filed on Dec. 3, 2019 in the Korean Intellectual Property Office, the disclosure of which is incorporated herein in its entirety by reference.

BACKGROUND

1. Field

The present disclosure relates to a combined fingerprint recognition touch sensor, an electronic apparatus including the same, and a fingerprint enrollment method.

2. Description of Related Art

A touch screen is an input device that, when a user touches or presses the screen with his or her finger or the like, recognizes a location or related information of the touched or pressed portion and transmits the recognized location or related information to a system. Touch screens are simple and easy to use. In particular, capacitive touch screens have high transmittance, excellent durability, high touch resolution, and multi-touch capabilities. Touch screen panels are applied to various electronic apparatuses, for example, mobile devices such as smartphones or tablet personal computers (PCs), automated teller machines (ATMs), automatic ticketing machines, navigation devices, and the like.

Recently, the necessity of personal authentication for various mobile devices and electronic apparatuses is gradually increasing. A personal authentication function using personal (e.g., biometric) unique features such as fingerprint, voice, face, and iris may be important in mobile devices, access controllers, financial devices, and the like. Fingerprint recognition technology for smartphones, tablet PCs (or tablet devices), and the like according to a related art method is configured such that a fingerprint recognition module is separate from a touch screen module.

SUMMARY

Provided are combined fingerprint recognition touch sensor capable of performing both fingerprint recognition and touch sensing and increasing a fingerprint authentication rate, electronic apparatuses including the same, and fingerprint enrollment methods.

Additional aspects will be set forth in part in the description which follows and, in part, will be apparent from the description, or may be learned by practice of the presented embodiments of the disclosure.

According to an aspect of an embodiment, a combined fingerprint recognition touch sensor includes: a touch sensing region; a plurality of parallel transmission lines extending in a first direction through the touch sensing region; a plurality of parallel reception lines extending in a second direction through the touch sensing region to intersect the plurality of transmission lines; a signal transmitter including a plurality of transmission groups configured to apply driving signals to the plurality of transmission lines, the plurality of transmission groups each including transmission lines, among the plurality of transmission lines, arranged adjacent to each other; a signal outputter including a plurality of reception groups configured to receive signals from the plurality of reception lines, the reception groups each including reception lines, among the plurality of reception lines, arranged adjacent to each other; a storage configured to store an enrolled fingerprint image to be compared with a fingerprint image obtained for fingerprint authentication; and a controller configured to control operations of the signal transmitter and the signal outputter according to a fingerprint enrollment mode, a fingerprint recognition mode, and a touch sensing mode, wherein, in the fingerprint enrollment mode, a fingerprint image of a finger for enrollment is obtained through one touch operation by applying, by the signal transmitter, driving signals to transmission lines belonging to two or more transmission groups and obtaining the fingerprint image for enrollment from a sensing zone including an initial touch region and a surrounding region.

The signal transmitter may be configured to, in the fingerprint enrollment mode, apply driving signals to the transmission lines belonging to the two or more transmission groups located in the sensing zone.

In the fingerprint enrollment mode, the driving signals may be sequentially applied to the transmission lines belonging to the two or more transmission groups; and fingerprint input signals may be simultaneously read via reception lines belonging to two or more reception groups passing through the sensing zone.

The transmission lines to which the driving signals are applied in the fingerprint enrollment mode may include all transmission lines belonging to the two or more transmission groups.

The transmission lines to which the driving signals are applied in the fingerprint enrollment mode may include some, and not all, transmission lines belonging to the two or more transmission groups.

A may be greater than or equal to B, where A is a number of the two or more transmission groups including the transmission lines to which the driving signals are applied in the fingerprint enrollment mode and B is a number of transmission groups including transmission lines to which driving signals are applied in the fingerprint recognition mode.

An area of the sensing zone in the fingerprint enrollment mode may be greater than or equal to an area of a sensing zone in the fingerprint recognition mode.

The signal transmitter may be configured to apply driving signals in units of individual transmission lines in one of the fingerprint enrollment mode and the fingerprint recognition mode and apply driving signals in units of transmission groups in the touch sensing mode.

The units of the transmission groups may correspond to a unit touch sensor.

The storage may be configured to divide the fingerprint image of the finger obtained through the one touch operation according to an authentication image size in the fingerprint enrollment mode and store the divided fingerprint image as the enrolled fingerprint image.

The storage may be configured to divide the fingerprint image of the finger obtained through the one touch operation according to an authentication image size in the fingerprint enrollment mode and store the enrolled fingerprint in such a manner as to allow a partial overlapping region.

According to an aspect of another embodiment, an electronic apparatus includes: a display panel; and the combined fingerprint recognition touch sensor.

According to an aspect of another embodiment, a fingerprint enrollment method includes: operating in a fingerprint enrollment mode for enrolling a fingerprint by using the combined fingerprint recognition touch sensor; sensing an initial touch region of a finger in the touch sensing region and applying driving signals to transmission lines belonging to two or more transmission groups, among a plurality transmission groups each comprising transmission lines adjacent to each other, passing through a sensing zone including the initial touch region and a surrounding region; and receiving fingerprint input signals from reception lines belonging to two or more reception groups, among a plurality of transmission groups each comprising reception lines adjacent to each other, passing through the sensing zone, and obtaining a fingerprint image of a finger through one touch operation.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
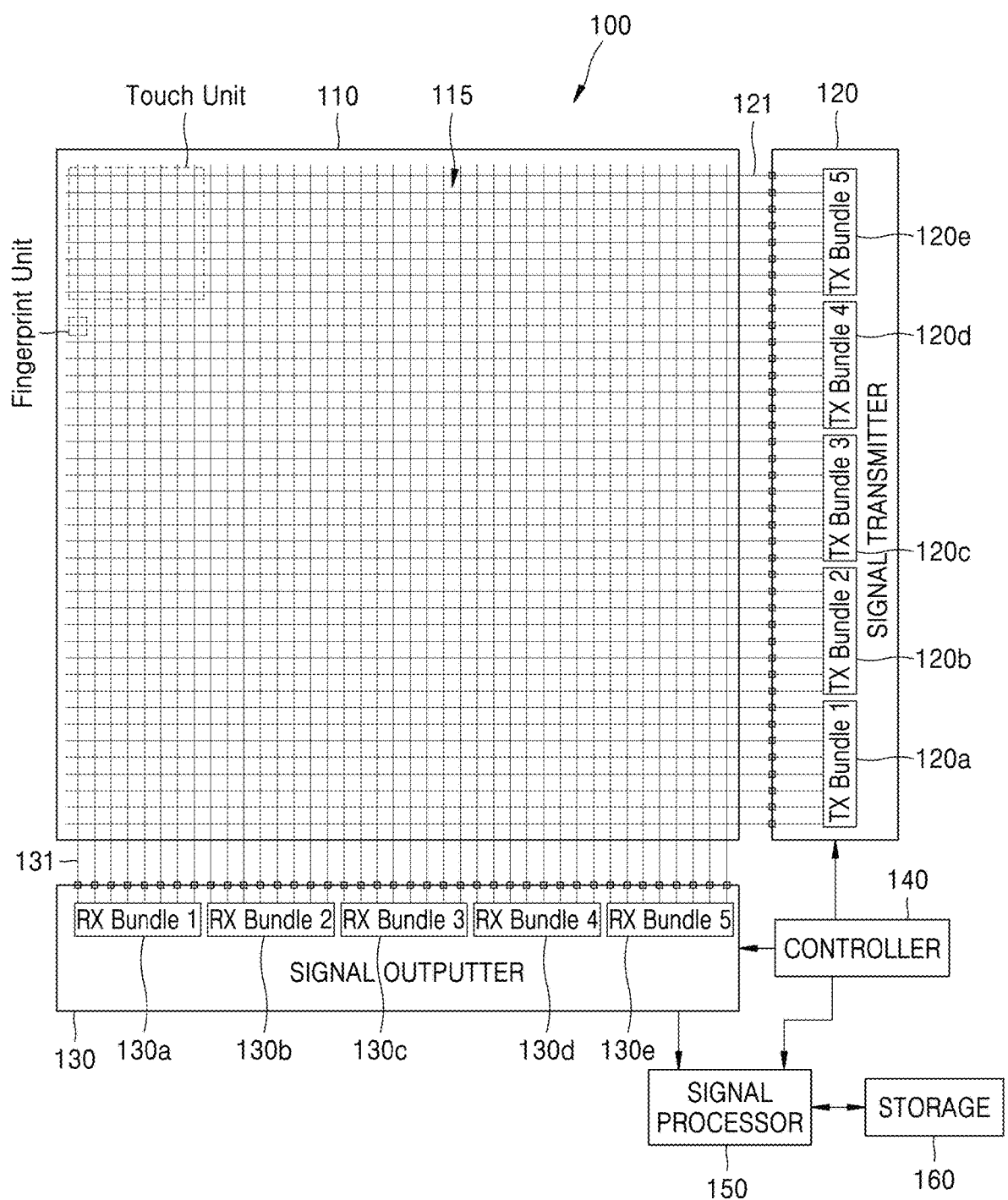
FIG. 1 schematically illustrates an exemplary configuration of a combined fingerprint recognition touch sensor according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments will be described in detail with reference to the accompanying drawings. In the drawings, like reference numerals refer to like elements, and the size of each element may be exaggerated for clarity and convenience of description. Embodiments described below are merely exemplary and various modifications may be made from these embodiments.

It will be understood that when an element is referred to as being arranged "on" or "above" another element, it may be directly or indirectly arranged on the other element. It will be understood that, although the terms "first," "second," etc., may be used herein to describe various elements, these terms are only used to distinguish one element from another. These terms do not limit difference in materials or structures of the elements. As used herein, the singular forms "a," "an," and "the" are intended to include the plural forms as well, unless the context clearly indicates otherwise. It will be understood that the terms "comprise," "include," or "have" as used herein specify the presence of stated elements, but do not preclude the presence or addition of one or more other elements. The use of the term "the" and similar terms may correspond to both the singular and the plural.

A fingerprint recognition touch sensor according to an embodiment is a sensor to which a capacitive method is applied. In a touch sensing mode, the fingerprint recognition touch sensor senses a location of a finger by measuring a change amount ($\Delta Cm$) of mutual capacitance (Cm) according to whether the finger touches through a plurality of individual nodes in which horizontally-arranged electrodes intersect vertically-arranged electrodes. In a fingerprint sensing mode for fingerprint enrollment or recognition, a fingerprint image is obtained by measuring a signal difference caused by mutual capacitance that changes according to a location of a ridge or a valley of a finger.

Touch sensing and fingerprint sensing have the same basic driving principle in that a difference of capacitance is detected. However, fingerprint sensing differs from touch sensing in that fingerprint sensing requires high spatial resolution (dense electrode patterns, 50 μm to 100 μm), as compared to touch sensing (3 mm to 5 mm). In addition, as compared with touch sensing, fingerprint sensing requires a relatively low Cm detection for each node. Therefore, fingerprint sensing requires a readout structure with high sensitivity.

In order to implement a touch sensor and a fingerprint sensor having different Cm ranges on the same plane, a plurality of fingerprint sensing lines is connected through a sensing integrated circuit (IC) at the time of touch to perform driving like the touch sensor, based on the same dense electrode patterns as the fingerprint sensor. A "one sensor/one chip" driving may be enabled by integrating touch sensing and fingerprint sensing into a single solution, thereby optimizing a module. The fingerprint sensor may be extended across the entire touch region, and fingerprint and touch may be realized with a single large-area sensor. Therefore, fingerprint sensing is possible in a wide region capable of being used as a touch sensor rather than a small area defined on a front or rear surface of an electronic apparatus.

FIG. 1 schematically illustrates an exemplary configuration of a combined fingerprint recognition touch sensor 100 according to an embodiment.

Referring to FIG. 1, the combined fingerprint recognition touch sensor 100 according to the present embodiment may include a touch panel 110 having a touch sensing region 115 and having a plurality of parallel transmission lines 121 and a plurality of parallel reception lines 131 arranged to intersect each other, a signal transmitter 120 configured to apply driving signals to the transmission lines 121, a signal outputter 130 configured to receive signals from the reception lines 131, and a controller 140 configured to control operations of the signal transmitter 120 and the signal outputter 130 according to at least one of a fingerprint enrollment mode, a fingerprint recognition mode, and a touch recognition mode (or touch sensing mode). In the fingerprint enrollment mode (or fingerprint registration mode), the combined fingerprint recognition touch sensor 100 according to the present embodiment may apply driving signals to the transmission lines 121 belonging to two or more transmission groups to read a fingerprint image of an initial contact region and a surrounding sensing region. Therefore, a fingerprint image of a finger may be obtained through one touch operation. The combined fingerprint recognition touch sensor 100 may further include a signal processor 150 configured to process a signal output from the signal outputter 130 to obtain a fingerprint input signal indicating fingerprint image information in the fingerprint enrollment mode or the fingerprint recognition mode and obtain a touch sensing signal in the touch sensing mode. In addition, the combined fingerprint recognition touch sensor 100 may further include a storage 160 configured to store an enrolled fingerprint image to be compared with an enrolled fingerprint at the time of fingerprint authentication. In FIG. 1, the signal transmitter 120, the signal outputter 130, the controller 140, and the signal processor 150 are separately illustrated for convenience of description. However, at least one of (or all of) the signal transmitter 120, the signal outputter 130, the controller 140, the signal processor 150, and the like may be implemented as a single electronic circuit. In addition, the controller 140, the signal processor 150, and the storage 160 may be disposed in an electronic apparatus (e.g., mobile device, navigation device, etc.) including the combined fingerprint recognition touch sensor 100. The touch panel 110 may be disposed on a display panel of the electronic apparatus or may be manufactured integrally with the display panel of the electronic apparatus.

The touch sensing region 115 may include a region capable of covering the entire fingerprint, or may include an area greater than such region. The parallel transmission lines 121 may extend in a first direction, for example, an x-axis direction. One end of each of the transmission lines 121 may be connected to the signal transmitter 120. In addition, the parallel reception lines 131 may extend in a second direction, for example, in a y-axis direction, so as to intersect the transmission lines 121. One end of each of the reception lines 131 may be connected to the signal outputter 130. The transmission lines 121 and the reception lines 131 may be arranged on different layers in a height direction of the touch panel 110 so as not to contact each other. A dielectric may be arranged between the layer on which the transmission lines 121 are arranged and the layer on which the reception lines 131 are arranged. Therefore, a node at which each of the transmission lines 121 and each of the reception lines 131 intersect each other may act as a capacitor. The node at which each of the transmission lines 121 and each of the reception lines 131 intersect each other may correspond to a unit fingerprint sensor (Fingerprint Unit). A unit touch sensor (Touch Unit) may include a two-dimensional (2D) array of a plurality of unit fingerprint sensors.

In the combined fingerprint recognition touch sensor 100 according to the present embodiment, the entire patterns may be configured in the form of the same pattern (for example, about 50 µm to 100 µm) of a resolution suitable for fingerprint measurement according to the fingerprint and the touch configuration. Further, in the combined fingerprint recognition touch sensor 100 according to the present embodiment, a touch sensor requiring a relatively lower resolution than a fingerprint measurement may be configured by grouping a plurality of fingerprint sensor patterns into a transmission group and a reception group in a circuit manner and thus, the touch sensor may be utilized in a touch mode. FIG. 1 illustrates an example in which the unit touch sensor includes the unit fingerprint sensors bundled in the 8x8 form. The number of bundles of unit fingerprint sensors constituting the unit touch sensor may vary according to, for example, an applied device and a fingerprint authentication type and is not limited to the above number. Unit transmission groups 120a, 120b, 120c, 120d, and 120e constitute a transmission circuit for each individual transmission line 121 and may be configured to be freely selectable in an N bit thermocode scheme.

The combined fingerprint recognition touch sensor 100 may sense a touch or a fingerprint in, for example, a capacitance scheme. In this case, self capacitance or mutual capacitance may be changed by a touch input or a fingerprint input at nodes at which the transmission lines 121 and the reception lines 131 intersect each other. The coordinates of the touch input or the image of the touched fingerprint may be calculated or determined from the capacitance change at the touched nodes. Therefore, the nodes at which the transmission lines 121 and the reception lines 131 intersect each other may act as pixels sensing a touch input or a fingerprint input. In FIG. 1, the transmission lines 121 and the reception lines 131 are illustrated as thin solid lines for convenience of description. However, in practice, a plurality of transparent electrode patterns may be arranged along the transmission lines 121 and the reception lines 131.

In addition, the combined fingerprint recognition touch sensor 100 may be configured to perform both fingerprint recognition and touch sensing. In order to obtain enough resolution to accurately recognize the pattern of the fingerprint, the transmission lines 121 and the reception lines 131 may be arranged at very narrow intervals, as compared with a general touch sensor that senses only a touch. For example, the transmission lines 121 and the reception lines 131 may be arranged at intervals of about 50 µm to about 70 µm.

Meanwhile, touch sensing that senses a touch does not require a higher resolution than fingerprint recognition. When the touch sensing is performed in the same manner as the fingerprint recognition, power consumption of the combined fingerprint recognition touch sensor 100 may be increased and the time required to scan the entire region of the touch panel 110 may be increased. Therefore, the operation of the combined fingerprint recognition touch sensor 100 is distinguished according to the fingerprint enrollment mode, the fingerprint recognition mode, and the touch sensing mode, and the combined fingerprint recognition touch sensor 100 may be operated differently in the fingerprint enrollment mode, the fingerprint recognition mode, and the touch sensing mode. By operating the combined fingerprint recognition touch sensor 100 in different modes, power consumption may be reduced and the overall battery life of the electronic device may be extended.

To this end, according to the present embodiment, the transmission lines 121 may be divided into a plurality of groups and the reception lines 131 may be divided into a plurality of groups. For example, the signal transmitter 120 of the combined fingerprint recognition touch sensor 100 may include a plurality of transmission groups 120a, 120b, 120c, 120d, and 120e arranged in a second direction in which the transmission lines 121 are arranged. The transmission groups 120a, 120b, 120c, 120d, and 120e may each include a plurality of transmission lines 121 arranged adjacent to each other. Similarly, the signal outputter 130 of the combined fingerprint recognition touch sensor 100 includes a plurality of reception groups 130a, 130b, 130c, 130d, and 130e arranged in a first direction in which the reception lines 131 are arranged. The reception groups 130a, 130b, 130c, 130d, and 130e may each include a plurality of reception lines 131 arranged adjacent to each other.

For convenience of description, FIG. 1 illustrates an example in which the signal transmitter 120 includes five transmission groups 120a, 120b, 120c, 120d, and 120e, the transmission groups 120a, 120b, 120c, 120d, and 120e each include eight transmission lines 121, the signal outputter 130 includes five reception groups 130a, 130b, 130c, 130d, and 130e, and the reception groups 130a, 130b, 130c, 130d, and 130e each include eight reception lines 131. It is understood, however, that this is merely an example. The number of transmission groups 120a, 120b, 120c, 120d, and 120e, the number of reception groups 130a, 130b, 130c, 130d, and 130e, the number of transmission lines 121, and the number of reception lines 131 may be greater than (or less than) described above. For example, the number of transmission lines 121 assigned to each of the transmission groups 120a, 120b, 120c, 120d, and 120e and the number of reception lines 131 assigned to each of the reception groups 130a, 130b, 130c, 130d, and 130e may be four, ten, twelve, or more. Furthermore, the number of transmission lines 121 assigned to each of the transmission groups 120a, 120b, 120c, 120d, and 120e and the number of reception lines 131 assigned to each of the reception groups 130a, 130b, 130c, 130d, and 130e may be different from each other.

Figure 2:
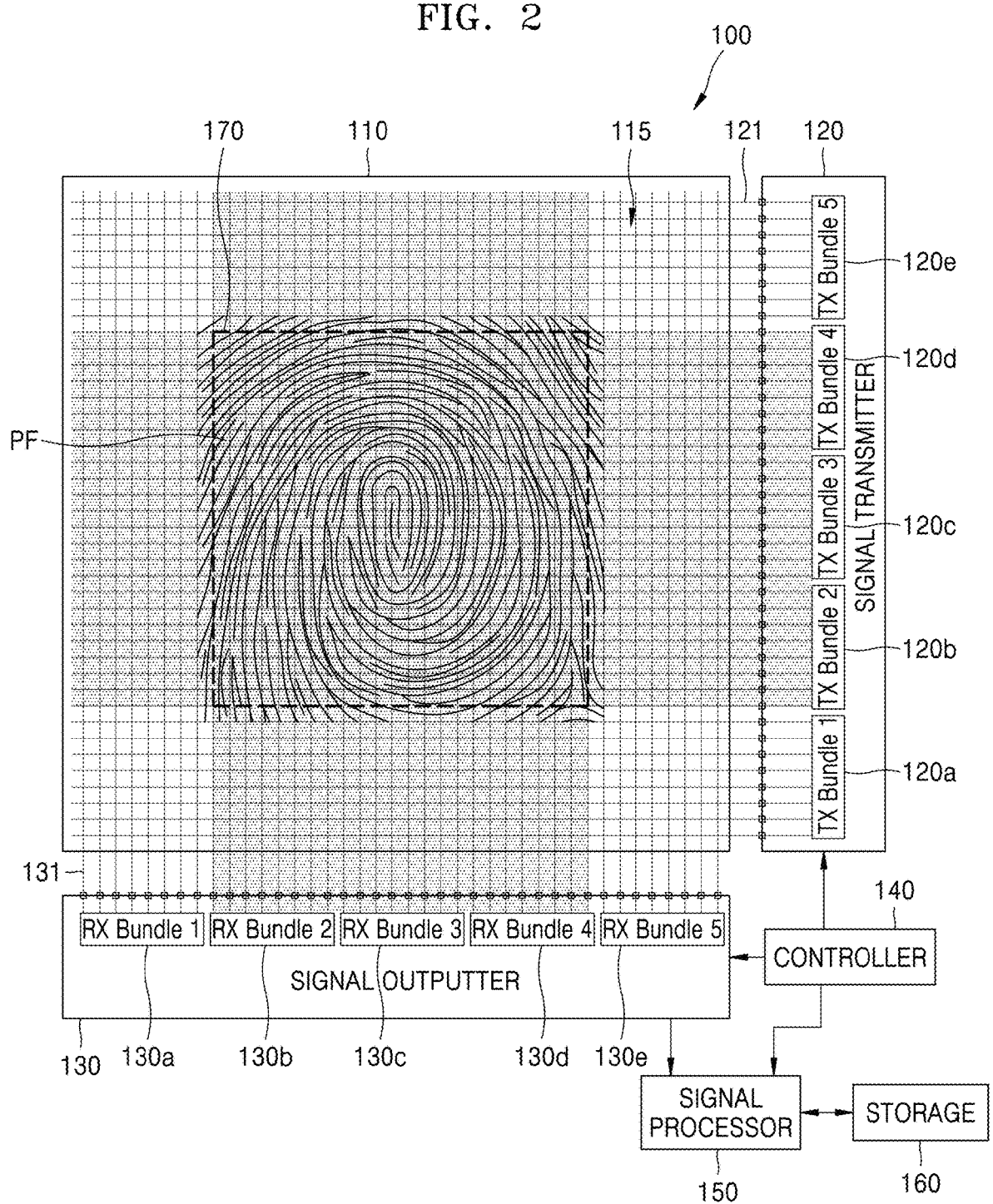
FIG. 2 exemplarily illustrates an operation of the combined fingerprint recognition touch sensor in a fingerprint enrollment mode according to an embodiment.

FIG. 2 exemplarily illustrates the operation of the combined fingerprint recognition touch sensor 100 in the fingerprint enrollment mode according to an embodiment.

Referring to FIG. 2, in the fingerprint enrollment mode, a fingerprint image of a sensing zone 170 including an initial touch region and a surrounding region may be read and driving signals may be applied to the transmission lines 121 belonging to two or more transmission groups, for example, three transmission groups 120b, 120c, and 120d, so as to obtain a fingerprint image of a finger through one touch operation. Hereinafter, for convenience of description, a case in which the transmission lines 121 included in the three transmission groups 120b, 120c, and 120d pass through the sensing zone 170 will be described. The number of transmission groups including the transmission lines 121 passing through the sensing zone 170 is not limited thereto in one or more other embodiments, and may for example be two, four, or more.

In the fingerprint enrollment mode, when (or based on) the fingertouches the touch sensing region 115 and the initial touch occurs, driving signals may be applied to the transmission lines 121 belonging to the three transmission groups 120b, 120c, and 120d passing through the sensing zone 170 in which the fingerprint PF of the initial touch region and the surrounding region touches the touch sensing region 115. A fingerprint input signal generated in the sensing zone 170 may be received through the reception lines 131 belonging to three reception groups 130b, 130c, and 130d intersecting the transmission lines 121 in the sensing zone 170. The sensing zone 170 may include the initial touch region and may be set to a range in which a fingerprint image of a finger for fingerprint enrollment may be obtained through one touch operation.

In the fingerprint enrollment mode, the combined fingerprint recognition touch sensor 100 may sequentially apply driving signals to the individual transmission lines 121 belonging to the transmission groups 120b, 120c, and 120d passing through the sensing zone 170 and receive a fingerprint input signal generated in the sensing zone 170 through the individual reception lines 131 belonging to the reception groups 130b, 130c, and 130d intersecting the transmission lines 121 in the sensing zone 170. In this case, the driving signals may or may not be applied to the individual transmission lines 121 belonging to the transmission groups 120a and 120e not passing through the sensing zone 170. Although the driving signals are applied to the individual transmission lines 121 belonging to the transmission groups 120a and 120e not passing through the sensing zone 170, when there is no touch of the fingerprint, no fingerprint input signals are generated in the individual reception lines 131 belonging to the reception groups 130a and 130e not passing through the sensing zone 170.

In FIG. 2, as an example, a portion to which the driving signals of the transmission lines 121 belonging to the transmission groups 120b, 120c, and 120d passing through the sensing zone 170 are applied and a portion in which the fingerprint input signals of the reception lines 131 belonging to the reception groups 130b, 130c, and 130d intersecting the transmission lines 121 in the sensing zone 170 are received are indicated by hatching.

As illustrated in FIG. 2, in the fingerprint enrollment mode, the signal transmitter 120 may sequentially apply the driving signals to the individual transmission lines 121 belonging to two or more transmission groups 120b, 120c, and 120d located in the sensing zone 170.

As illustrated in FIG. 2, in this fingerprint enrollment mode, the transmission lines 121 to which the driving signals are applied may include all transmission lines belonging to two or more transmission groups 120b, 120c, and 120d.

FIG. 2 illustrates an example in which the sensing zone 170 corresponds to a region through which the transmission lines 121 belonging to three transmission groups 120b, 120c, and 120d pass. However, the sensing zone 170 may correspond to a region through which some transmission lines belonging to two or more transmission groups pass. In this case, the driving signals may be applied to only some transmission lines or may be applied to all transmission lines belonging to the two or more transmission groups.

Figure 3:
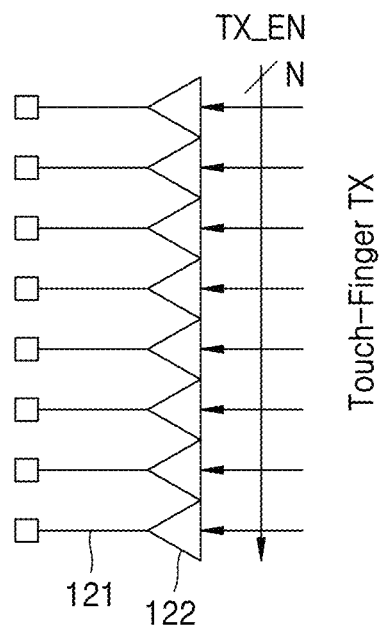
FIG. 3 exemplarily illustrates an operation of a transmission circuit of a signal transmitter according to an embodiment.

FIG. 3 exemplarily illustrates an operation of a transmission circuit of the signal transmitter 120 according to an embodiment.

Referring to FIG. 3, the signal transmitter 120 may include a plurality of transmission circuits 122. Each of the transmission circuits 122 may be connected to one transmission line 121 corresponding thereto and apply a driving signal to the one transmission line 121 corresponding thereto. Therefore, the number of transmission circuits 122 in the signal transmitter 120 may be equal to the number of transmission lines 121. FIG. 3 exemplarily illustrates the transmission circuits 122 and the transmission lines 121 respectively connected thereto in one transmission group of the signal transmitter 120.

As exemplarily illustrated in FIG. 3, the transmission circuits 122 in the respective transmission groups to which the transmission lines 121 passing through the sensing zone 170 belong may be activated by a transmission control signal TX_EN of the controller 140 and may apply driving signals to the transmission lines 121 connected to the transmission circuits 122. In the touch sensing mode, the transmission circuits 122 in the respective transmission groups may be simultaneously activated by the transmission control signal TX_EN of the controller 140 and may simultaneously apply driving signals to the transmission lines 121 connected to the transmission circuits 122. In addition, in the fingerprint enrollment mode or the fingerprint recognition mode, the transmission circuits 122 in the respective transmission groups may be sequentially activated by the transmission control signal TX_EN of the controller 140 and may sequentially apply driving signals to the transmission lines 121 connected to the transmission circuits 122.

In the fingerprint enrollment mode, when the transmission lines 121 passing through the sensing zone 170 are some (and not all) transmission lines in the transmission group, only the transmission circuits 122 connected to some transmission lines may be activated by the transmission control signal TX_EN of the controller 140 and may apply driving signals to the transmission lines 121 connected to the transmission circuits 122. According to another embodiment, even when the transmission lines 121 passing through the sensing zone 170 are some transmission lines in the transmission group, the transmission circuits 122 connected to all the transmission lines in the transmission group may be activated by the transmission control signal TX_EN of the controller 140 and may apply driving signals to all the transmission lines 121 connected to the transmission circuits 122.

Figure 4:
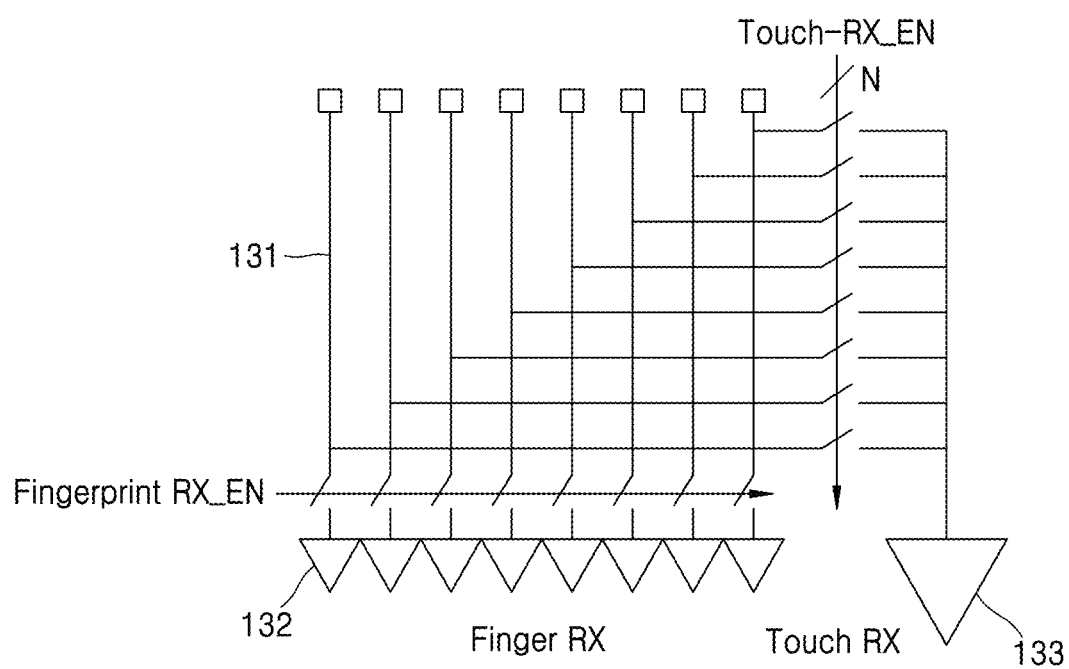
FIG. 4 exemplarily illustrates a configuration of a signal outputter according to an embodiment.

FIG. 4 exemplarily illustrates the configuration of the signal outputter 130 according to an embodiment.

Referring to FIG. 4, the signal outputter 130 may include a plurality of fingerprint enrollment and fingerprint recognition reception circuits 132 and a plurality of touch sensing reception circuits 133. Each of the fingerprint enrollment and fingerprint recognition reception circuits 132 may be connected to a reception line 131 corresponding thereto and may receive, from the reception line 131 connected thereto, a fingerprint input signal generated by a change ACM in mutual capacitance. Therefore, the total number of fingerprint enrollment and fingerprint recognition reception circuits 132 in the signal outputter 130 may be equal to the total number of reception lines 131.

The touch sensing reception circuits 133 are arranged to correspond to a plurality of reception groups 130a, 130b, 130c, 130d, and 130e, respectively. That is, one touch sensing reception circuit 133 may be arranged in each of the reception groups 130a, 130b, 130c, 130d, and 130e. Therefore, the total number of touch sensing reception circuits 133 in the signal outputter 130 may be equal to the total number of reception groups 130a, 130b, 130c, 130d, and 130e.

Figure 5A:
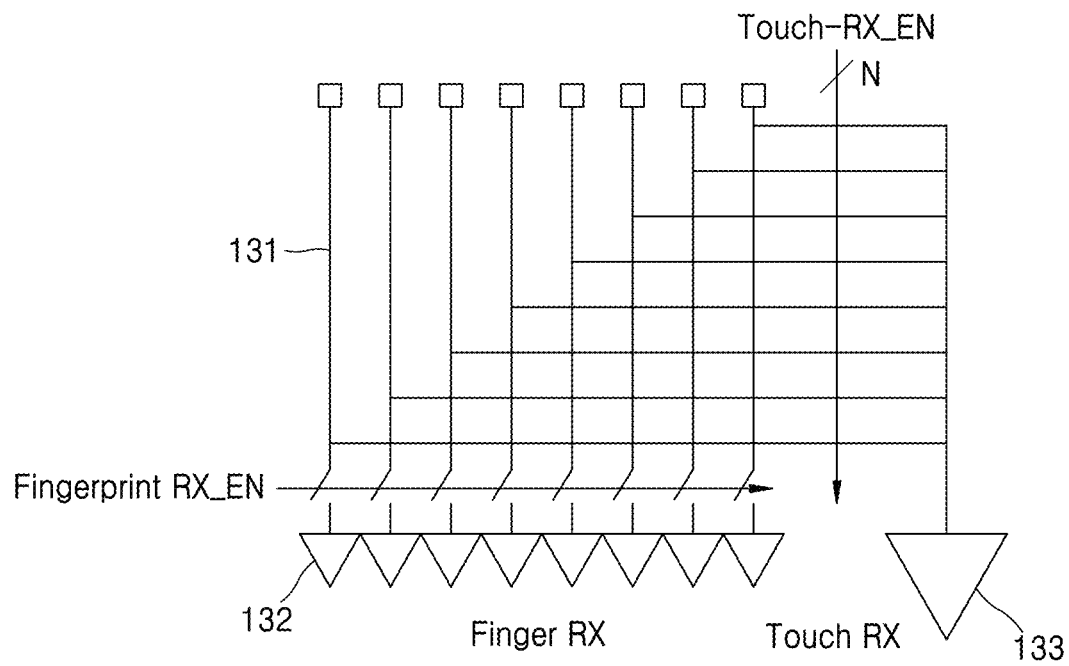
FIG. 5A illustrates a connection between a reception line and a touch sensing reception circuit of a signal outputter in a touch sensing mode according to an embodiment.

As illustrated in FIG. 5A, one touch sensing reception circuit 133 may be connected to all the reception lines 131 arranged in the corresponding reception groups 130a, 130b, 130c, 130d, and 130e through a touch reception control signal Touch-RX_EN provided from the controller 140.

Figure 5B:
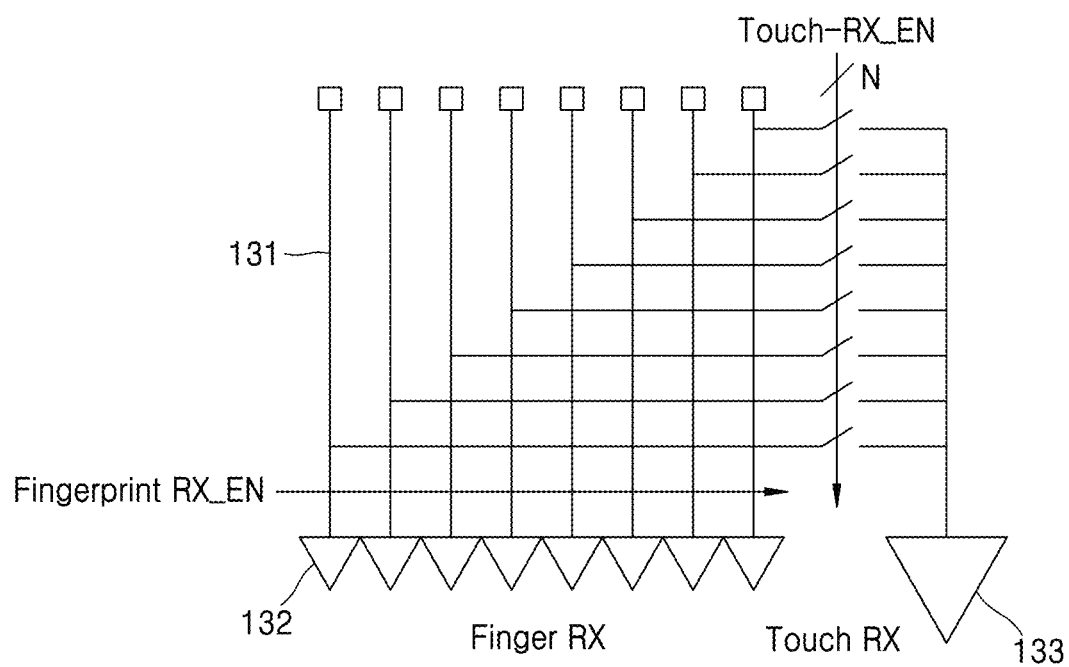
FIG. 5B illustrates a connection between a reception line and a fingerprint sensing reception circuit of a signal outputter in a fingerprint enrollment mode or a fingerprint recognition mode according to an embodiment.

As illustrated in FIG. 5B, in the fingerprint enrollment mode or the fingerprint recognition mode, the signal outputter 130 may receive touch signals individually from all the reception lines 131 passing through the sensing zone 170. To this end, all the fingerprint recognition reception circuits 132 to be connected to the reception lines 131 passing through the sensing zone 170 in the signal outputter 130 are activated by a fingerprint reception control signal Fingerprint RX_EN of the controller 140 and may connect all the fingerprint recognition reception circuits 132 to the corresponding reception lines 131. In this case, the controller 140 disconnects the touch sensing reception circuits 133 from the corresponding reception lines 131 through the touch reception control signal Touch-RX_EN. In this manner, the fingerprint input signal generated at the nodes between one transmission line 121 to which the driving signal is applied and the reception lines 131 intersecting the transmission line 121 may be individually detected.

In the fingerprint enrollment mode or the fingerprint recognition mode, the fingerprint input signals may be individually received from the reception lines 131 while sequentially applying the driving signals to the transmission lines 121 passing through the sensing zone 170. As described above, since the area of the node A at which one transmission line 121 and one reception line 131 intersect each other is small, the fingerprint may be precisely recognized by scanning the touch panel 110 at a high resolution. In addition, the accuracy of fingerprint recognition may be improved by increasing the voltage of the driving signal applied to the transmission line 121 in the fingerprint enrollment mode or the fingerprint recognition mode.

Referring back to FIGS. 1 and 2, in the fingerprint enrollment mode, the driving signals are sequentially applied to the transmission lines 121 belonging to two or more transmission groups passing through the sensing zone 170, for example, three transmission groups 120b, 120c, and 120d, and the signal processor 150 processes the fingerprint input signals received through the reception lines 131 belonging to two or more reception groups intersecting the transmission lines 121, for example, three reception groups 130b, 130c, and 130d. In this manner, the enrolled (or registered) fingerprint image of the finger is obtained through one touch operation and the enrolled fingerprint is stored in the storage 160.

Figure 6:
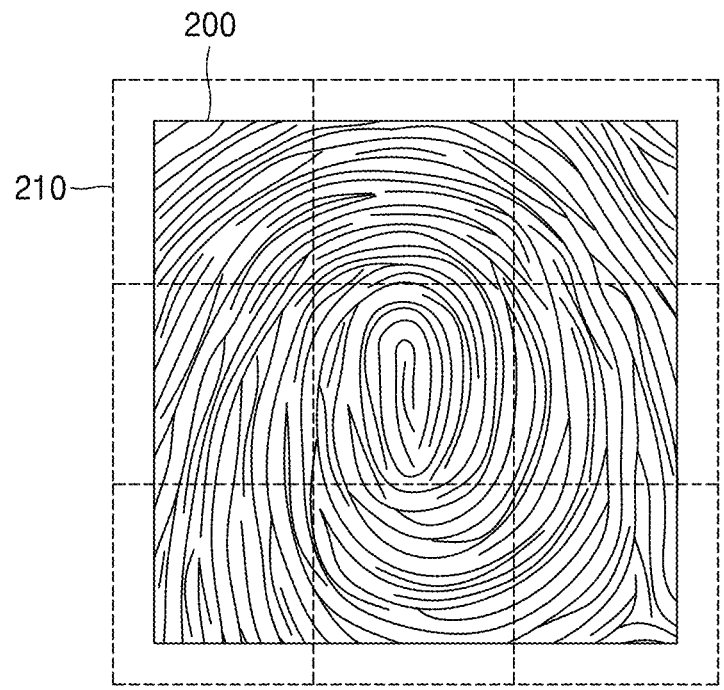
FIG. 6 illustrates an example of dividing a fingerprint image of a finger obtained through one touch operation according to an authentication image size and storing the divided fingerprint image as an enrolled fingerprint according to an embodiment.

In this case, as illustrated in FIG. 6, a fingerprint image 200 of the finger obtained through one touch operation may be divided according to an authentication image size 210 and stored as the enrolled fingerprint.

Figure 7:
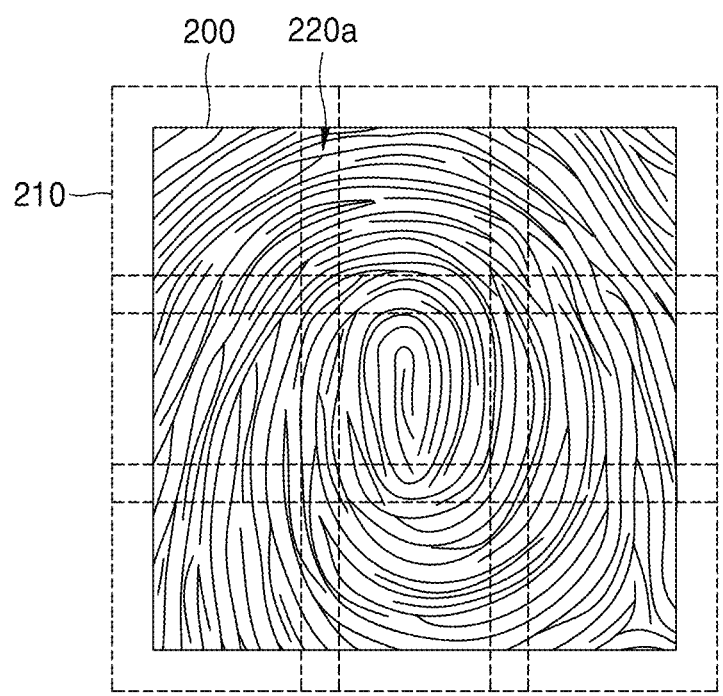
FIG. 7 illustrates an example of dividing a fingerprint image of a finger obtained through one touch operation according to an authentication image size and storing the divided fingerprint image as an enrolled fingerprint in such a manner as to allow a partial overlapping region according to an embodiment.

In addition, as illustrated in FIG. 7, the enrolled fingerprint may be stored in such a manner that the fingerprint image 200 of the finger obtained through one touch operation is divided according to the authentication image size 220 and a partial overlapping region 220a is permitted.

Figure 8:
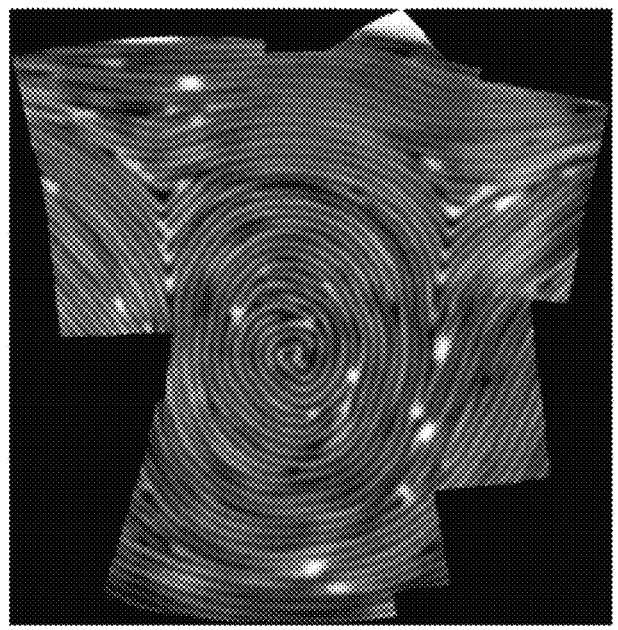
FIG. 8 illustrates an image reconstructed by stitching an enrolled fingerprint obtained through an enrollment procedure according to a plurality of operations as in a related art method.

For example, in FIG. 2, the partial fingerprint obtained in FIG. 8 may be matched so as to improve the authentication speed and perform a low power operation at the time of authenticating the entire fingerprint obtained simultaneously while activating the transmission groups and the reception lines 131 of the reception groups of upper, lower, left, and right side centered on the transmission group TX Bundle 3 and the reception group RX Bundle 3, which are the locations at which the strongest signal is detected in the touch. Therefore, the fingerprint is converted in the form of a partial fingerprint that is advantageous for comparison and a result of the converting is stored. As illustrated in FIG. 6, the enrolled fingerprint may be divided and stored so as not to overlap the adjacent region. According to another embodiment, as illustrated in FIG. 7, the enrolled fingerprint may be divided and stored, in an overlapped form of a partial region so as to increase the consistency of the image at the time of fingerprint authentication.

Figure 9:
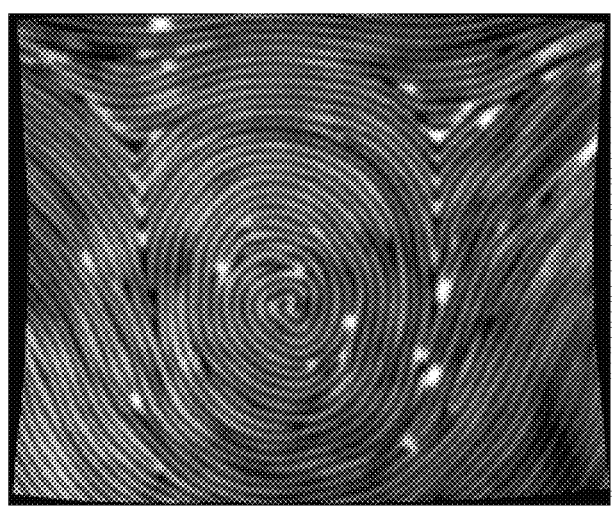
FIG. 9 illustrates a fingerprint image obtained through one touch operation in a combined fingerprint recognition touch sensor according to an embodiment.

FIG. 8 illustrates an image reconstructed by stitching an enrolled fingerprint obtained through an enrollment procedure according to a plurality of operations as in a related art method. FIG. 9 illustrates a fingerprint image obtained through one touch operation in a large-area fingerprint sensor such as the combined fingerprint recognition touch sensor 100 according to an embodiment.

Even when it is determined that the fingerprint region has been sufficiently covered through a plurality of repetitions by a user touch, there is a limitation in expressing the entire fingerprint as illustrated in FIG. 8, which may be missed. Meanwhile, the proposed method as illustrated in FIG. 9 may obtain an enrolled image that perfectly represents the entire fingerprint through the image obtained simultaneously by utilizing the sensor and the driving circuit that advantageously uses the large area at the location at which the finger is fixed.

Figure 10:
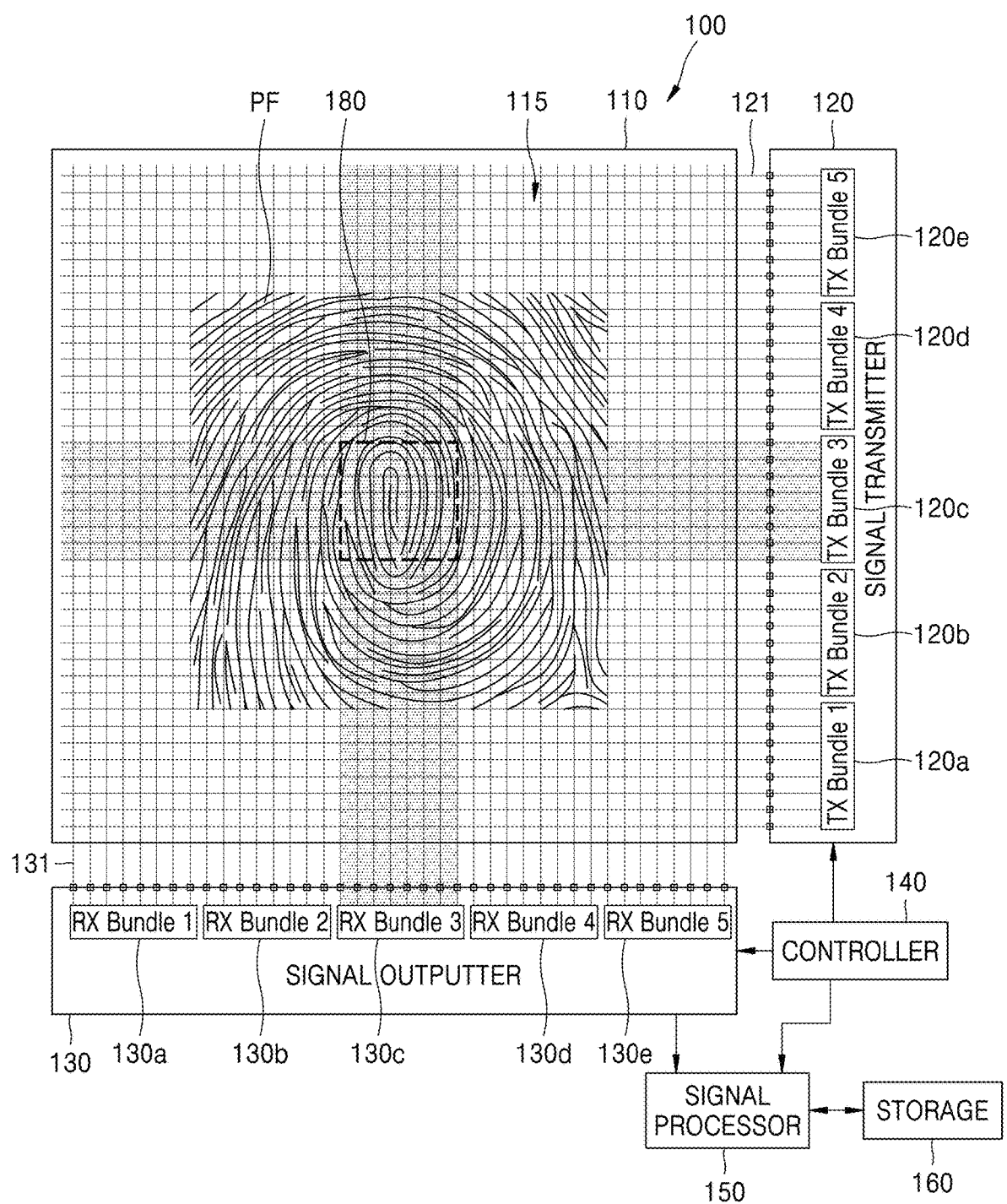
FIG. 10 exemplarily illustrates an operation of a combined fingerprint recognition touch sensor according to the embodiment in a fingerprint recognition mode.

FIG. 10 exemplarily illustrates an operation of the combined fingerprint recognition touch sensor 100 in a fingerprint recognition mode according to an embodiment.

Referring to FIG. 10, in the fingerprint recognition mode, a fingerprint image of a sensing zone 180 including an initial touch region and a surrounding region may be read and a driving signal may be applied to a transmission lines 121 belonging to at least one transmission group so as to obtain the fingerprint image of a finger through one touch operation. A case in which the sensing zone 180 corresponds to a region through which a transmission line 121 included in one transmission group 120c and a reception line 131 belonging to one reception group 130c intersecting the transmission line 121 pass is exemplarily illustrated in FIG. 10 for convenience of description. It is understood that the sensing zone 180 in the fingerprint recognition mode may correspond to a region through which transmission lines belonging to two or more transmission groups and reception lines belonging to two or more reception groups intersecting the transmission lines pass.

In the fingerprint recognition mode, when (or based on) the finger touches the touch sensing region 115 and the initial touch occurs, driving signals may be sequentially applied to the transmission lines 121 belonging to the transmission group 120c passing through the sensing zone 180 in which the fingerprint PF of the initial touch region and the surrounding region touches the touch sensing region 115. A fingerprint input signal generated in the sensing zone 180 may be received through the reception lines 131 belonging to the reception group 130c intersecting the transmission lines 121 in the sensing zone 180. The sensing zone 180 may include the initial touch region and may be set to a range in which a fingerprint image of a finger for fingerprint recognition may be obtained through one touch operation. The size of the sensing zone 180 may correspond to the authentication image sizes 210 and 220 in FIGS. 6 and 7.

Even in the fingerprint recognition mode, the combined fingerprint recognition touch sensor 100 may or may not apply the driving signals to the individual transmission lines belonging to the transmission groups 120a, 120b, 120d, and 120e not passing through the sensing zone 180. Although the driving signals are applied to the individual transmission lines 121 belonging to the transmission groups 120a, 120b, 120d, and 120e not passing through the sensing zone 180, when there is no touch of the fingerprint, no fingerprint input signal is generated in the individual reception lines 131 belonging to the reception groups 130a, 130b, 130d, and 130e not passing through the sensing zone 180.

In FIG. 10, as an example, a portion of the transmission lines 121 belonging to the transmission group 120c passing through the sensing zone 180 in which the driving signals are applied and a portion of the reception lines 131 belonging to the reception groups 130c intersecting the transmission lines 121 in the sensing zone 180 in which the fingerprint input signals are received, are indicated by hatching.

As can be seen by comparing FIGS. 2 and 10, in the combined fingerprint recognition touch sensor 100 according to an embodiment, a condition of A B may be satisfied when the number of transmission groups including transmission lines to which driving signals are applied in the fingerprint enrollment mode is A and the number of transmission groups including transmission lines to which driving signals are applied in the fingerprint recognition mode is B.

In this case, the area of the sensing zone 170 in the fingerprint enrollment mode may be equal to or greater than the area of the sensing zone 180 in the fingerprint recognition mode.

In the fingerprint recognition mode, when (or based on) the initial touch occurs, the driving signals are sequentially applied to the transmission lines 121 belonging to at least one transmission group, for example, the transmission group 120c, passing through the sensing zone 180 including the initial touch region and the surrounding region. In this case, the signal processor 150 processes the fingerprint input signals received through the reception lines 131 belonging to at least one reception group, for example, the reception group 130c intersecting the transmission lines 121. The fingerprint image of the finger is obtained through one touch operation, and the fingerprint image is compared with the enrolled fingerprint stored in the storage 160 so as to determine whether the fingerprint image matches the enrolled fingerprint. In this manner, the fingerprint recognition operation is performed.

In the combined fingerprint recognition touch sensor 100 according to an embodiment such as described above, the fingerprint enrollment is possible through one touch operation in the touch sensing region 115 that includes a region capable of covering the entire fingerprint. Also, the entire finger to be authenticated may be covered, and thus the fingerprint authentication rate may be increased, as compared with the related art fingerprint enrollment method through a plurality of times of small areas.

That is, in the combined fingerprint recognition touch sensor 100 according to an embodiment, it is possible to implement a large-area sensor (referring to a fingerprint sensor over a region capable of covering an entire fingerprint of a finger) in which a touch/fingerprint sensor capable of obtaining and enrolling the entire fingerprint of the finger to be authenticated at once is combined. Therefore, unlike the related art method, the user need not perform an enrollment procedure according to a plurality of operations (i.e., repeated operations), thereby increasing usability. In addition, it is possible to prevent the degradation of the authentication rate due to the loss of the fingerprint cover region caused by the enrollment through the user experience.

In the combined fingerprint recognition touch sensor 100 according to an embodiment, due to the characteristics of the large-area fingerprint sensor, it may not be possible to know beforehand where fingerprint recognition is to be input. Therefore, based on the coordinates of the combined fingerprint recognition touch sensor 100 as illustrated in FIG. 2, the fingerprint image is obtained by reading fingerprint sensing lines of the coordinates (TX Bundle 3, RX Bundle 3) recognized when (or based on) the finger touches the surface of the sensor. Unlike a device in which a fingerprint input region of an entire region is fixed on hardware, the combined fingerprint recognition touch sensor 100 according to an embodiment may obtain a fingerprint of a large area at the same time by activating a peripheral fingerprint sensing region such as peripheral sensing lines TX Bundle 2, 4 and RX Bundle 2, 4 of fingerprint acquisition regions TX Bundle 3 and RX Bundle 3. When an image of a new fingerprint is enrolled on a device, the features of the large-area fingerprint sensor may be utilized as described above to simultaneously obtain and enroll the entire region in which the fingerprint is placed by using a plurality of sensing lines. In order to improve the authentication rate, various regions of the fingerprint have to be sufficiently expressed. However, in the case of enrollment by repetitive image acquisition through the user experience, it is difficult to express a sufficient region, and a region that leaks at the time of fingerprint enrollment may easily or naturally occur. Meanwhile, when the finger is placed on the combined fingerprint recognition touch sensor 100 having the characteristics of a large-area fingerprint sensor, according to an embodiment, rather than an operation in which the hand repeatedly touches and releases, and the sensor sequentially obtains an image, a complete fingerprint image may be easily obtained. At this time, the total acquisition time may also be shorter than the time for individual acquisitions through a plurality of times. Fundamentally, the use of the combined fingerprint recognition touch sensor 100 according to an embodiment may sense the fingerprint in the entire fingerprint region. However, when the entire region is scanned, a reduction in authentication speed and power loss may be caused. Therefore, image matching may be performed through an authentication algorithm of selectively obtaining only a partial region having a fingerprint input from the entire region at the time of fingerprint authentication, as illustrated in FIG. 10, and comparing the matching degree with respect to the enrolled fingerprint obtained in FIG. 2.

The combined fingerprint recognition touch sensor 100 as described above may be applied to various electronic apparatuses such as smartphones, smart watches, tablet PCs, laptop computers, televisions, personal digital assistants (PDAs), portable multimedia players (PMPs), etc.

Figure 11:
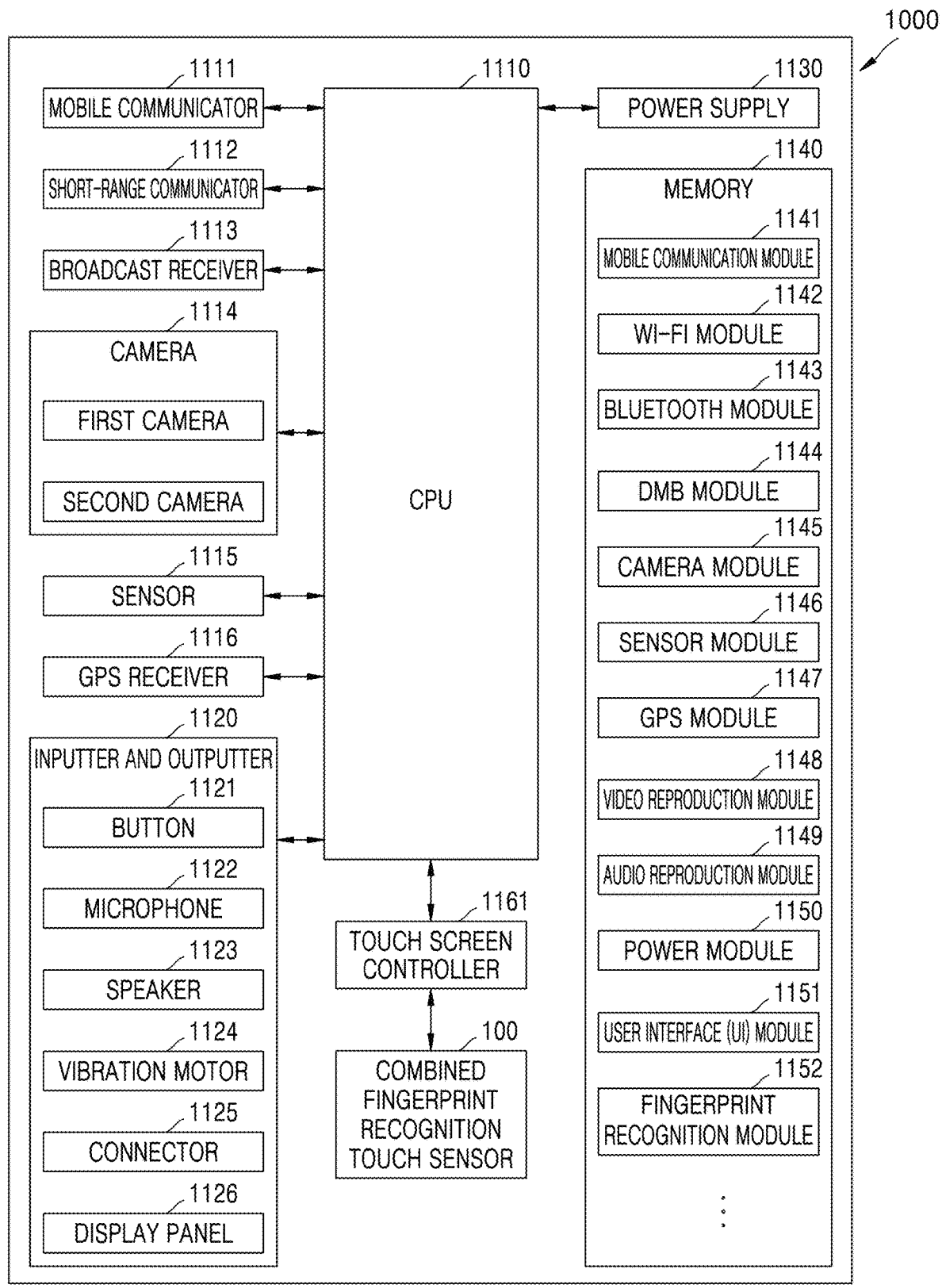
FIG. 11 is a block diagram exemplarily illustrating a configuration of an electronic apparatus including a combined fingerprint recognition touch sensor, according to an embodiment.

FIG. 11 is a block diagram exemplarily illustrating a configuration of an electronic apparatus 1000 including a combined fingerprint recognition touch sensor 100, according to an embodiment.

Referring to FIG. 11, the electronic apparatus 1000 may include, for example, a central processing unit (CPU) 1110, a mobile communicator 1111, a short-range communicator 1112, a broadcast receiver 1113, a camera 1114, a sensor 1115, a global positioning system (GPS) receiver 1116, an inputter and outputter 1120, a power supply 1130, a memory 1140, and the like. The term "unit" or "-or/-er" as used herein may be a hardware component and/or a software component executed by the hardware component or by at least one processor (e.g., the CPU 1110).

The mobile communicator 1111 may transmit and receive a wireless signal with at least one of a base station, an external terminal, or a server on a mobile communication network. Examples of the wireless signal may include a voice call signal, a video call signal, or various formats of data to support transmission and reception of text and multimedia messages. The short-range communicator 1112 may perform short-range wireless communication. The short-range communicator 1112 may include a Bluetooth communicator, a Bluetooth low energy (BLE) communicator, a near field communicator (NFC), a wireless local access network (WLAN) (Wi-Fi) communicator, a Zigbee communicator, an infrared data association (IrDA) communicator, a Wi-Fi direct (WFD) communicator, an ultra wideband (UWB) communicator, or an Ant+ communicator, but the present disclosure is not limited thereto.

The broadcast receiver 1113 receives a digital multimedia broadcasting (DMB) broadcast signal. The camera 1114 includes a lens and an optical element for capturing a picture or a video. The sensor 1115 may include, for example, a gravity sensor that detects the movement of the electronic apparatus 1000, an illumination sensor that detects the brightness of light, a proximity sensor that detects the proximity of a person, a motion sensor that detects the movement of a person, and the like. The GPS receiver 1116 receives a GPS signal from an artificial satellite. The GPS signal may be used to provide various services to users.

In addition, the inputter and outputter 1120 may provide an interface with an external device or a user and may include at least one of a button 1121, a microphone 1122, a speaker 1123, a vibration motor 1124, a connector 1125, a display panel 1126, and the like. The power supply 1130 is connected to a battery or an external power source so as to supply power to the electronic apparatus 1000.

The memory 1140 may store various programs that are executed by the CPU 1110. The CPU 1110 may control programs stored in the memory 1140 and operations of other components described above. The programs stored in the memory 1140 may be divided into a plurality of modules according to functions thereof. The modules may include, for example, a mobile communication module 1141, a Wi-Fi module 1142, a Bluetooth module 1143, a DMB module 1144, a camera module 1145, a sensor module 1146, a GPS module 1147, a video reproduction module 1148, an audio reproduction module 1149, a power module 1150, a user interface (UI) module 1151, and/or a fingerprint recognition module 1153.

The electronic apparatus 1000 may further include a combined fingerprint recognition touch sensor 100 and a touch screen controller 1161. The combined fingerprint recognition touch sensor 100 may be arranged on the display panel 1126 or may be manufactured integrally with the display panel 1126. The touch screen controller 1161 may control the operations of the signal transmitter 120 and the signal outputter 130 of the combined fingerprint recognition touch sensor 100 in cooperation with the controller 140 of the combined fingerprint recognition touch sensor 100. The touch screen controller 1161 may be integrally formed with the controller 140 of the combined fingerprint recognition touch sensor 100 in the electronic apparatus 1000 or may be software installed on the electronic apparatus 1000.

Therefore, for example, the electronic apparatus 1000 may perform fingerprint enrollment to be used for user authentication by just touching the display panel 1126 with a finger of a user.

In addition, when the electronic apparatus 1000 requires user authentication in a state in which a fingerprint of a user is previously registered and the user presets to perform user authentication by fingerprint recognition, the touch screen controller 1161 may switch the operation of the combined fingerprint recognition touch sensor 100 to the fingerprint recognition mode. For example, when the electronic apparatus 1000 requires user authentication so as to release a screen lock in a screen lock state, the fingerprint recognition mode may be started. Alternatively, the fingerprint recognition mode may be started based on an authentication procedure for a particular application, e.g., when user authentication is required to perform online banking, online payment, or the like by using the electronic apparatus 1000. When the fingerprint recognition mode is started, the CPU 1110 may execute or control, for example, the fingerprint recognition module 1153, and the fingerprint recognition module 1153 may control the signal transmitter 120 and the signal outputter 130 through the touch screen controller 1161.

Therefore, for example, the electronic apparatus 1000 may enroll the fingerprint used for user authentication or perform the fingerprint recognition for user authentication by just touching the display panel 1126 with the finger of the user. This eliminates the need for a separate fingerprint sensor, thereby saving a space for the fingerprint sensor.

Meanwhile, when a general touch operation of selecting a specific screen region on the display panel 1126 or scrolling a screen is performed, the touch screen controller 1161 may switch the operation of the combined fingerprint recognition touch sensor 100 to a low resolution touch sensing mode. In addition, when the user executes a handwriting input program that allows the user to input letters or numbers by touch, the touch screen controller 1161 may switch the operation of the combined fingerprint recognition touch sensor 100 to a high resolution touch sensing mode.

While the combined fingerprint recognition touch sensor 100 and the electronic apparatus 1000 including the same have been described above with reference to the embodiments illustrated in the accompanying drawings, these are merely examples. It will be understood by those of ordinary skill in the art that various modifications and equivalent other embodiments may be made thereto. Accordingly, the embodiments described herein should be considered in a descriptive sense only and not for purposes of limitation. The scope of the present disclosure is set forth in at least the claims rather than the foregoing description, and all differences within the scope equivalent thereto should be construed as falling within in the scope of the present disclosure.

In the combined fingerprint recognition touch sensor 100 according to one or more embodiments, a fingerprint may be enrolled with only one touch operation in the touch sensing region capable of covering the entire fingerprint, and the entire finger to be authenticated may be covered. Therefore, as compared with the related art fingerprint enrollment method through a plurality of touches of small areas, the fingerprint authentication rate may be increased and the fingerprint enrollment and authentication time may be shortened, thereby increasing usability.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by at least the following claims.

What is claimed is:

1. A combined fingerprint recognition touch sensor comprising:
    a touch sensing region;
    a plurality of parallel transmission lines extending in a first direction through the touch sensing region;
    a plurality of parallel reception lines extending in a second direction through the touch sensing region to intersect the plurality of transmission lines;
    a signal transmitter comprising a plurality of transmission groups configured to apply driving signals to the plurality of parallel transmission lines, the plurality of transmission groups each comprising transmission lines, among the plurality of parallel transmission lines, arranged adjacent to each other;
    a signal outputter comprising a plurality of reception groups configured to receive signals from the plurality of parallel reception lines, the reception groups each comprising reception lines, among the plurality of parallel reception lines, arranged adjacent to each other;
    a storage configured to store an enrolled fingerprint image to be compared with a fingerprint image obtained for fingerprint authentication; and
    a controller configured to control operations of the signal transmitter and the signal outputter according to a fingerprint enrollment mode, a fingerprint recognition mode, and a touch sensing mode,
    wherein, in the fingerprint enrollment mode, a fingerprint image of a finger for enrollment is obtained through one touch operation by applying, by the signal transmitter, driving signals to transmission lines belonging to two or more transmission groups and obtaining the fingerprint image for enrollment from a sensing zone including an initial touch region and a surrounding region.

2. The combined fingerprint recognition touch sensor of claim 1, wherein the signal transmitter is configured to, in the fingerprint enrollment mode, apply driving signals to the transmission lines belonging to the two or more transmission groups located in the sensing zone.

3. The combined fingerprint recognition touch sensor of claim 2, wherein:
    in the fingerprint enrollment mode, the driving signals are sequentially applied to the transmission lines belonging to the two or more transmission groups; and
    fingerprint input signals are simultaneously read via reception lines belonging to two or more reception groups passing through the sensing zone.

4. The combined fingerprint recognition touch sensor of claim 2, wherein the transmission lines to which the driving signals are applied in the fingerprint enrollment mode comprise all transmission lines belonging to the two or more transmission groups.

5. The combined fingerprint recognition touch sensor of claim 2, wherein the transmission lines to which the driving signals are applied in the fingerprint enrollment mode include some, and not all, transmission lines belonging to the two or more transmission groups.

6. The combined fingerprint recognition touch sensor of claim 2, wherein A≥B, where A is a number of the two or more transmission groups comprising the transmission lines to which the driving signals are applied in the fingerprint enrollment mode and B is a number of transmission groups comprising transmission lines to which driving signals are applied in the fingerprint recognition mode.

7. The combined fingerprint recognition touch sensor of claim 6, wherein an area of the sensing zone in the fingerprint enrollment mode is greater than or equal to an area of a sensing zone in the fingerprint recognition mode.

8. The combined fingerprint recognition touch sensor of claim 1, wherein the signal transmitter is configured to apply driving signals in units of individual transmission lines in one of the fingerprint enrollment mode and the fingerprint recognition mode and apply driving signals in units of transmission groups in the touch sensing mode.

9. The combined fingerprint recognition touch sensor of claim 8, wherein the units of the transmission groups correspond to a unit touch sensor.

10. The combined fingerprint recognition touch sensor of claim 1, wherein the storage is configured to divide the fingerprint image of the finger obtained through the one touch operation according to an authentication image size in the fingerprint enrollment mode and store the divided fingerprint image as the enrolled fingerprint image.

11. The combined fingerprint recognition touch sensor of claim 1, wherein the storage is configured to divide the fingerprint image of the finger obtained through the one touch operation according to an authentication image size in the fingerprint enrollment mode and store the enrolled fingerprint in such a manner as to allow a partial overlapping region.

12. An electronic apparatus comprising:
a display panel; and
the combined fingerprint recognition touch sensor of claim 1.

13. The electronic apparatus of claim 12, wherein the signal transmitter of the combined fingerprint recognition touch sensor is configured to, in the fingerprint enrollment mode, apply driving signals to the transmission lines belonging to the two or more transmission groups located in the sensing zone.

14. The electronic apparatus of claim 13, wherein:
in the fingerprint enrollment mode, the driving signals of the combined fingerprint recognition touch sensor are sequentially applied to the transmission lines belonging to the two or more transmission groups; and
fingerprint input signals are simultaneously read via reception lines belonging to two or more reception groups passing through the sensing zone.

15. The electronic apparatus of claim 12, wherein the signal transmitter of the combined fingerprint recognition touch sensor is configured to apply driving signals in units of individual transmission lines in one of the fingerprint enrollment mode and the fingerprint recognition mode and apply driving signals in units of transmission groups in the touch sensing mode.

16. The electronic apparatus of claim 12, wherein the storage of the combined fingerprint recognition touch sensor is configured to divide the fingerprint image of the finger obtained through the one touch operation according to an authentication image size in the fingerprint enrollment mode and store the divided fingerprint image as the enrolled fingerprint image.

17. The electronic apparatus of claim 12, wherein the storage of the combined fingerprint recognition touch sensor is configured to divide the fingerprint image of the finger obtained through the one touch operation according to an authentication image size in the fingerprint enrollment mode and store the enrolled fingerprint image in such a manner as to allow a partial overlapping region.

18. A fingerprint enrollment method of a fingerprint recognition touch sensor comprising a plurality of parallel transmission lines extending through a touch sensing region and a plurality of parallel reception lines extending through the touch sensing region and intersecting the plurality of parallel transmission lines, the fingerprint enrollment method comprising:
operating in a fingerprint enrollment mode for enrolling a fingerprint image;
sensing an initial touch region of a finger in the touch sensing region and applying driving signals to transmission lines belonging to two or more transmission groups, among a plurality transmission groups each comprising transmission lines adjacent to each other, passing through a sensing zone including the initial touch region and a surrounding region; and
receiving fingerprint input signals from reception lines belonging to two or more reception groups, among a plurality of transmission groups each comprising reception lines adjacent to each other, passing through the sensing zone, and obtaining a fingerprint image of a finger through one touch operation.

19. The fingerprint enrollment method of claim 18, wherein the fingerprint image of the finger obtained through the one touch operation is divided according to an authentication image size and stored as an enrolled fingerprint image.

20. The fingerprint enrollment method of claim 18, wherein the fingerprint image of the finger obtained through the one touch operation is divided according to an authentication image size and stored as an enrolled fingerprint image in such a manner as to allow a partial overlapping region.

* * * * *